(12) United States Patent
Bienfang et al.

(10) Patent No.: US 9,388,689 B2
(45) Date of Patent: Jul. 12, 2016

(54) MULTI-DECK MINING VEHICLE

(71) Applicant: Caterpillar Global Mining LLC, Oak Creek, WI (US)

(72) Inventors: David T. Bienfang, Racine, WI (US); Frank R. Szpek, Jr., Franklin, WI (US); Carl D. Gilmore, South Milwaukee, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 662 days.

(21) Appl. No.: 13/756,967

(22) Filed: Feb. 1, 2013

(65) Prior Publication Data

US 2014/0219762 A1 Aug. 7, 2014

(51) Int. Cl.

| B66C 23/00 | (2006.01) |
|---|---|
| B66F 9/00 | (2006.01) |
| E02F 3/00 | (2006.01) |
| E21C 27/30 | (2006.01) |
| E02F 3/46 | (2006.01) |
| E02F 9/08 | (2006.01) |
| B60R 3/00 | (2006.01) |
| B62D 55/06 | (2006.01) |

(52) U.S. Cl.
CPC ............... *E21C 27/30* (2013.01); *B60R 3/005* (2013.01); *E02F 3/46* (2013.01); *E02F 9/0833* (2013.01); *B62D 55/06* (2013.01)

(58) Field of Classification Search
CPC .......... E02F 3/304; E02F 3/4075; E02F 3/40; E02F 3/60; E02F 3/32; E02F 5/025; E02F 3/34; E02F 3/286; E02F 9/18; E02F 3/962; E02F 3/3663; E02F 3/46; E02F 9/0833; A01D 85/001; E21C 27/30; B60R 3/005; B62D 55/06

See application file for complete search history.

(56) References Cited

U.S. PATENT DOCUMENTS

| 8,136,272 | B2 * | 3/2012 | Hren | E02F 3/4075 37/445 |
|---|---|---|---|---|
| 8,590,180 | B2 * | 11/2013 | Hren | E02F 3/4075 37/445 |
| 2004/0247398 | A1 | 12/2004 | Lane et al. | |
| 2011/0301817 | A1 | 12/2011 | Hobenshield et al. | |
| 2012/0055149 | A1 | 3/2012 | Vonderwell | |
| 2012/0076628 | A1 * | 3/2012 | Gilmore | E02F 9/2267 414/687 |
| 2012/0086220 | A1 | 4/2012 | Abdel-Baqi et al. | |
| 2012/0089279 | A1 | 4/2012 | Onsager et al. | |

FOREIGN PATENT DOCUMENTS

JP 2005-298096 10/2005

* cited by examiner

*Primary Examiner* — Stephen Vu

(57) ABSTRACT

A mining vehicle includes one or more crawlers, a first deck positioned above the crawlers, and a second deck positioned above the first deck. The first deck includes a first floor surface providing a walking surface, and one or more first deck maintenance components configured to allow a person to move among and access the first deck maintenance components. The second deck includes a second floor surface providing a walking surface, one or more second deck maintenance components, and one or more aisles configured to allow a person to move among and access the second deck maintenance components. The first and second decks are configured to provide maintenance access to the first and second deck maintenance components.

13 Claims, 5 Drawing Sheets

MULTI-DECK MINING VEHICLE

TECHNICAL FIELD

This disclosure relates to large industrial vehicles having components requiring periodic maintenance and features for improving the maintainability of such components.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Large industrial vehicles, such as mining shovels or excavators, typically include a number of components that must be serviced or maintained periodically (e.g. on a preventative maintenance schedule, etc.) in order to preserve the operational performance, reliability, and efficiency of the vehicle (i.e. maintenance components). The maintenance components are often housed within a single deck. As industrial vehicles have become more complex, the number of maintenance components within the deck has increased, and the maintenance components have become larger. In addition, efforts have been made to reduce or limit the footprint (i.e. occupied area) of these industrial vehicles, thereby limiting the area of the deck. As a result, the deck layout has become overcrowded with maintenance components, limiting access to the maintenance components, and creating confined spaces on the deck.

Conventional mining vehicles typically include a main level machinery house for housing the maintenance components. Most of the maintenance components are contained within the main level machinery house, but some maintenance components, such as gear cases and/or drive cases, are kept below the machinery house underneath the mining vehicle. Typically, at least a lift and a harness are required for maintenance personnel to access the maintenance components located underneath the vehicle. The mining vehicle may not be operable while these maintenance components are being serviced, resulting in extended machine downtime. In addition, the maintenance components located within the main level machinery house may be close together because of the number and size of the maintenance components. The confined spaces within the machinery house may make it more difficult to service the maintenance components, increasing the service time for the components and again resulting in extended machine downtime.

SUMMARY

An embodiment of the present disclosure relates to a mining vehicle. The mining vehicle includes one or more crawlers configured to move the mining vehicle along a surface, and a first deck positioned above the crawlers and having a first inner housing and a first outer housing. The first deck includes a first floor surface configured to provide a walking surface for a person to walk within the first inner housing, and one or more first deck maintenance components positioned within the first inner housing and configured to allow a person to move among and access the first deck maintenance components.

In this embodiment, the mining vehicle also includes a second deck positioned above the first deck and having a second inner housing and a second outer housing. The second deck includes a second floor surface configured to provide a walking surface for a person to walk within the second inner housing, one or more second deck maintenance components positioned within the second inner housing, and one or more aisles formed by the second floor surface and the second deck maintenance components, the aisles configured to allow a person to move among and access the second deck maintenance components. Further in this embodiment, the first and second decks are configured to provide maintenance access to the first and second deck maintenance components.

Another embodiment of the present disclosure relates to a mining vehicle. The mining vehicle includes one or more crawlers configured to move the mining vehicle along a surface, a dipper assembly, a boom assembly coupled to the dipper assembly and configured to apply a force to the dipper assembly, and an inner housing positioned above the crawlers. The inner housing includes a floor surface configured to allow a person to walk along the floor surface within the inner housing, one or more sections formed by one or more partitions, the sections comprising one or more openings sized and configured to allow a person to move through the openings and between sections, and one or more maintenance components positioned within the sections and configured to allow a person to move between the maintenance components, and to provide maintenance access to the maintenance components. In this embodiment, the mining vehicle also includes a walkway coupled to an outer housing of the mining vehicle, the walkway providing access to the inner housing, and a staircase coupled to the walkway and configured to provide access to the walkway from other portions of the mining vehicle.

Another embodiment of the present disclosure relates to a machine housing for a mining vehicle. The machine housing includes an upper level disposed within an interior of the machine housing, a lower level disposed below the upper level within the interior of the machine housing, hoist machinery housed in the upper level, swing drives and swing gear cases housed in the lower level. The machine housing also includes an upper floor surface disposed in the upper level, the upper floor surface being sized and configured to allow maintenance personnel to reach the hoist machinery, and a lower floor surface disposed in the lower level, the lower floor surface being sized and configured to allow maintenance personnel to reach the swing drives and swing gear cases.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
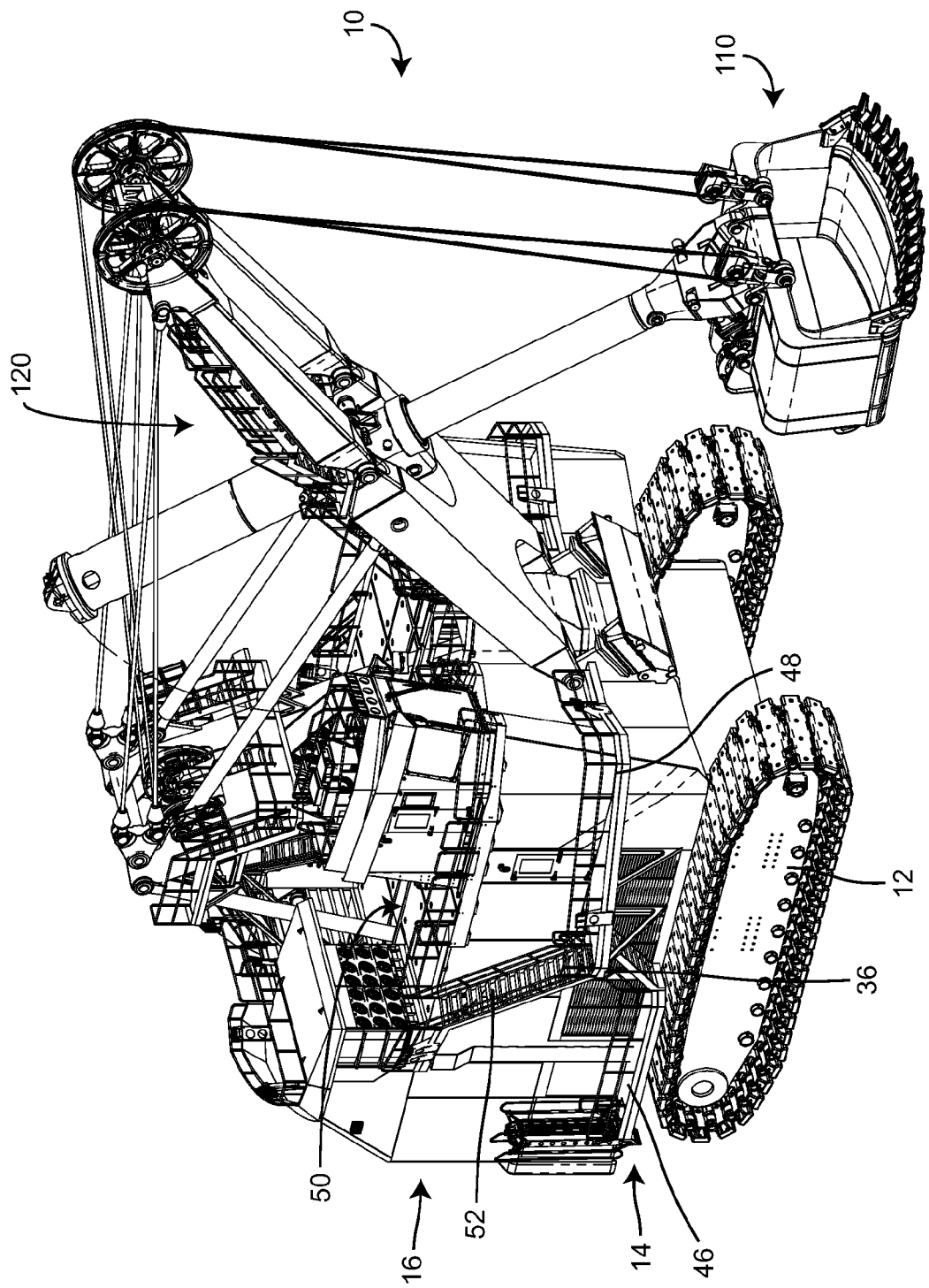
FIG. 1 is a perspective view of a mining vehicle of the present disclosure, according to an exemplary embodiment.
Figure 2:
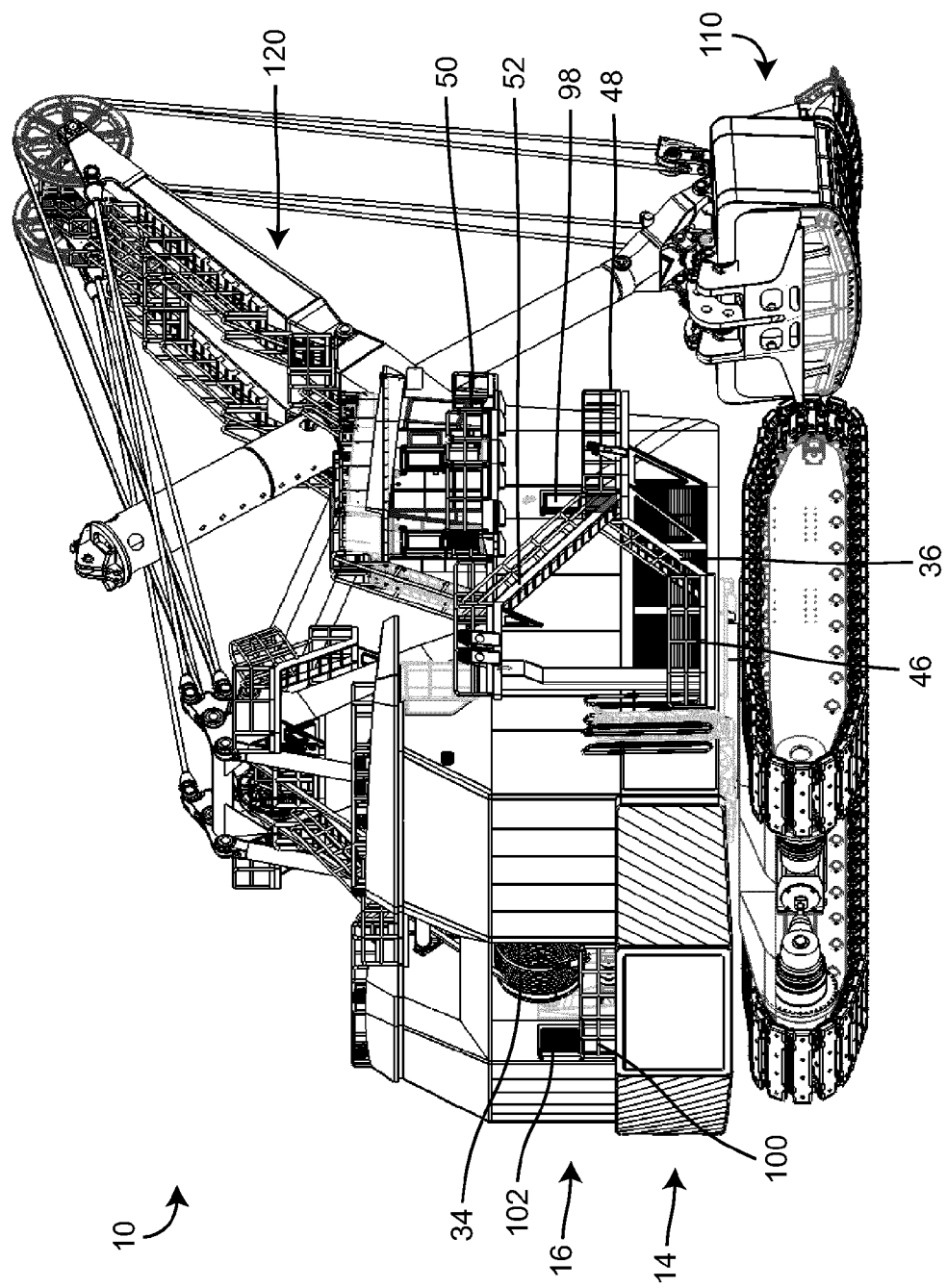
FIG. 2 is another perspective view of the mining vehicle of FIG. 1.
Figure 3:
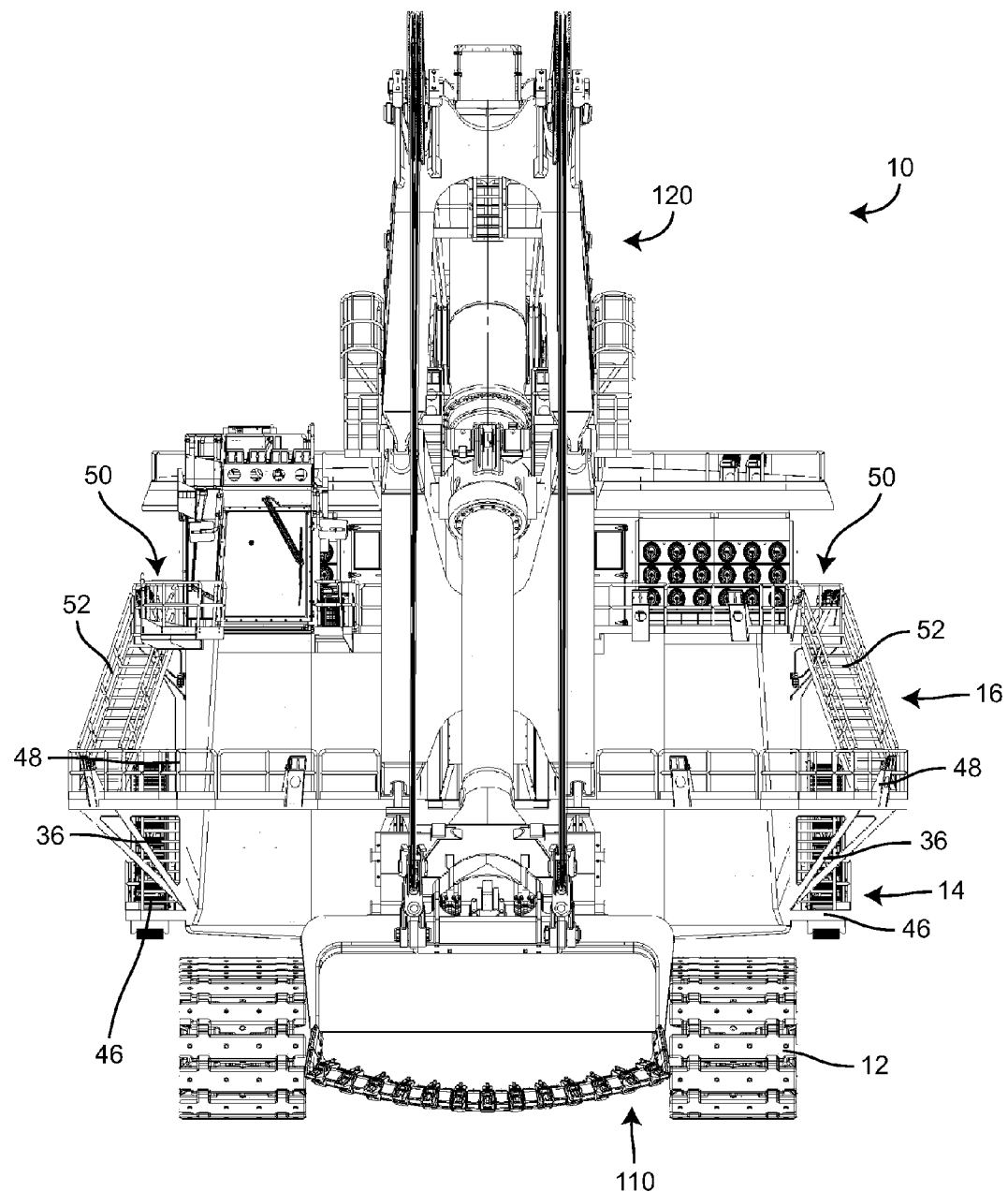
FIG. 3 is a front view of the mining vehicle of FIG. 1.

Referring to FIGS. 1 through 3, a mining vehicle of the present disclosure is shown, according to an exemplary embodiment having improved maintainability features. The mining vehicle 10 includes one or more crawlers 12 that rotate along a surface (e.g. mining surface), moving the mining vehicle 10 along the surface. The mining vehicle 10 may also include a dipper assembly 110 coupled to a boom assembly 120. The boom assembly 120 is configured to apply a crowding force to the dipper assembly 110, forcing the dipper assembly 110 into a mining surface (i.e. a bank of material such as overburden, ore, or other material to be mined or moved and referred to collectively as "mining material"). The dipper assembly 110 is forced into the bank by the crowding force, digging into the bank and filling the dipper assembly 110 with mining material. The mining vehicle 10 includes a lower level or first deck, shown as sub deck 14, and an upper level or second deck, shown as main deck 16. The sub deck 14 is positioned above the crawlers 12. The sub deck 14 includes an inner portion housing one or more components of the mining vehicle 10 (shown in further detail in FIG. 5). The sub deck 14 also includes an outer portion shown in FIGS. 1 through 3. The outer portion of the sub deck 14 includes a walking path 46 positioned on the outside of the mining vehicle 10 and along the outer wall of the sub deck 14. The walking path 46 is coupled to a staircase 36. The staircase 36 extends from the walking path 46 to the main deck 16. The staircase 36 is intended to allow a person to move between the sub deck 14 and the main deck 16.

In exemplary embodiments, the sub deck 14 includes an inner portion configured to allow a person to stand up within the sub deck 14. The inner portion of the sub deck 14 is shown in further detail in FIG. 5. The sub deck 14 may also include a floor surface 68 (shown in FIG. 5) configured to allow a person to walk between maintenance components of the mining vehicle 10 that are located within the sub deck 14. In exemplary embodiments, the floor surface 68 is coupled to the bottom of the mining vehicle 10.

In the illustrated embodiment of FIGS. 1 through 3, the mining vehicle 10 also includes a main deck 16 (e.g. main level machinery house, etc.) positioned above the sub deck 14. The main deck 16 has an inner portion that houses one or more maintenance components of the mining vehicle 10. The inner portion of the main deck 16 is shown in further detail in FIG. 4. In exemplary embodiments, the main deck 16 is configured to allow a person to stand up within the main deck 16. The main deck 16 may also include a floor surface 60 (shown in FIG. 4) configured to allow a person to walk between maintenance components located within the inner portion of the main deck 16. The mining vehicle 10 includes a walking path 48 that extends along the outer perimeter of the main deck 16 and is coupled to the staircase 36. The walking path 48 is also coupled to a staircase 52 extending from the walking path 48 to the top portion 50 of the mining vehicle 10. The staircase 52 allows maintenance personnel or other persons to move between the main deck 16 and the top portion 50 of the mining vehicle 10.

Figure 4:
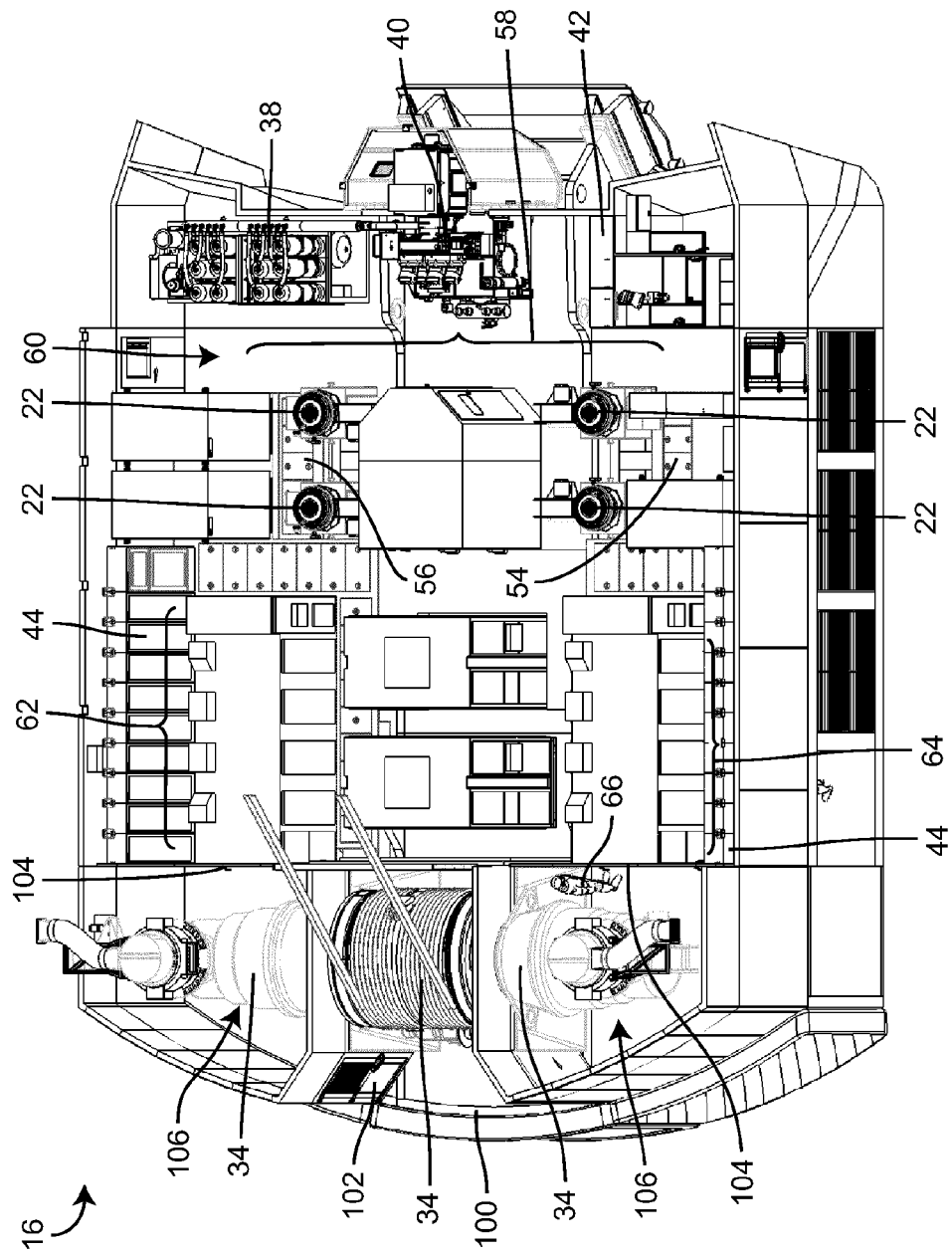
FIG. 4 is a top perspective view of a main deck for a mining vehicle, according to an exemplary embodiment.

Referring still to FIG. 2, the mining vehicle 10 also includes hoist machinery 34 located partially at the back of the vehicle 10 and partially within the main deck 16 (shown in further detail in FIG. 4). A portion of the hoist machinery 34 is not covered and is configured to allow a maintenance technician or other vehicle personnel to service the hoist machinery 34 from a platform 100. The platform 100 may be accessed by a door 102 formed within a wall of the main deck 16. FIG. 2 shows another door 98 sized and configured to allow a person to enter the inner portion of the main deck 16. In exemplary embodiments, the sub deck 14 also includes a door (not shown) sized and configured to allow a person to enter the inner portion of the sub deck 14.

Referring now to FIG. 4, a main deck arrangement for a mining vehicle is shown, according to an exemplary embodiment. In this embodiment, the main deck 16 has an interior portion that houses one or more maintenance components. The bottom of the main deck 16 forms the floor surface 60. The floor surface 60 is configured to provide a walking surface for a person such as maintenance worker 66 to walk between maintenance components. In the illustrated embodiment of FIGS. 4 and 5, the maintenance worker 66 is a person of average height and weight. The main deck 16 is sized such that the maintenance worker 66 is able to walk along the floor surface 60 and throughout the main deck 16 while standing fully upright. In some embodiments, the main deck 16 and sub deck 14 may be configured to allow persons of above average height and weight to walk along the floor surface 60 without interference. The maintenance components are positioned within the main deck 16 to provide one or more aisles, such as aisle 58. The aisles, including aisle 58, are configured to allow a person to move within the main deck 16 in order to service the maintenance components.

In exemplary embodiments, the main deck 16 includes one or more swing motors 22 positioned along aisles 54 and 56. The aisles 54 and 56 are sized to allow a person to service the swing motors 22 while standing within the aisle 54 or 56. The main deck 16 may also include an auxiliary air system 38, a power skid 40, and a PLC 42 positioned along aisle 58 so that the components 38, 40, and 42 are more readily accessible for service. The maintenance components 38, 40, and 42 are configured within the main deck 16 to allow a person to service the components 38, 40, and 42 from within the aisle 58. The main deck 16 is also shown to include two motor control center (MCC) cabinets 44. The cabinets 44 are positioned along aisles 62 and 64 so that a person may service the contents of the cabinets 44 from within the aisle 62 or 64.

The hoist machinery 34 is shown in FIG. 4 as being partially within the inner portion of the main deck 16. The hoist machinery 34 may be accessed from the inner portion of the main deck 16 through one or more doors 104. The doors 104 are located at an end of aisle 44 and are sized and configured to allow a person to move from aisle 44 to hoist machinery sections 106 in order to service the hoist machinery. The door 102 leads from the section 106 to the platform 100 outside of the vehicle 10. The rope portion of the hoist machinery is located adjacent to the platform 100 and may be serviced from the platform 100.

Figure 5:
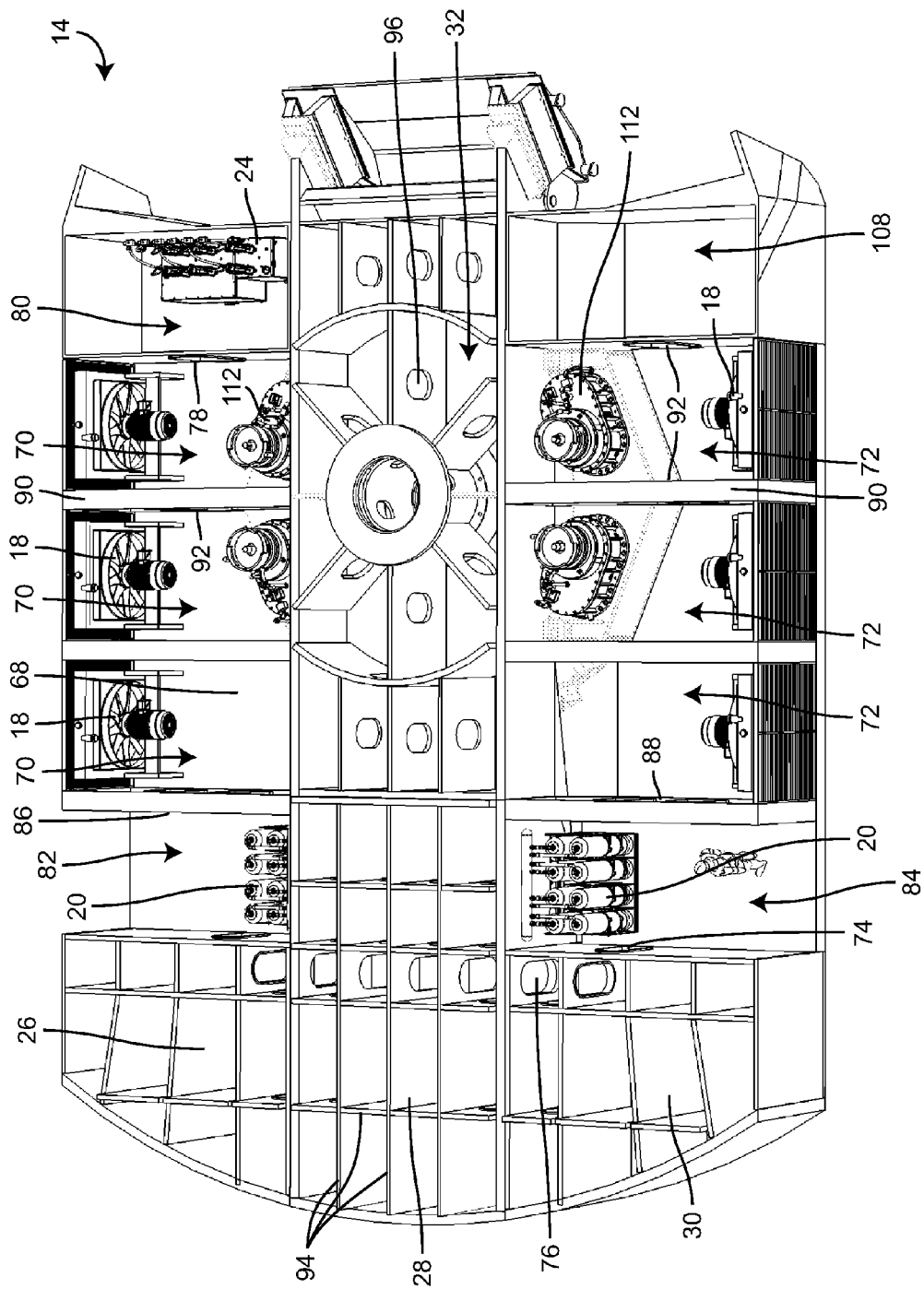
FIG. 5 is a top perspective view of a sub deck for a mining vehicle, according to an exemplary embodiment.

Referring now to FIG. 5, a sub deck arrangement for a mining vehicle is shown, according to an exemplary embodiment. The sub deck 14 is positioned below the main deck 16 within the mining vehicle 10. In exemplary embodiments, the floor surface 60 of the main deck 16 forms the ceiling (not shown) of the sub deck 14. The sub deck 14 includes an interior portion, shown in FIG. 4, that houses one or more maintenance components. The bottom of the sub deck 14 forms the floor surface 68. The floor surface 68 is configured to provide a walking surface for a person such as the maintenance worker 66 to walk within the sub deck 14. In exemplary embodiments, the sub deck 14 is sized so that the maintenance worker 66 can walk along the floor surface 68 and throughout the sub deck 14 while standing fully upright. In some embodiments, the sub deck 14 is sized to allow a person of above average height and weight to walk the floor surface 68 without interference.

In the illustrated embodiment of FIG. 5, the sub deck 14 includes a group of three sections 70 formed by partitions 90 and a group of three sections 72 formed by partitions 90. In this embodiment, the sub deck 14 includes oil coolers 18 positioned within each of the sub deck sections 70 and 72. The sub deck 14 also includes swing gear cases 112 positioned opposite the oil coolers 18 within two of the sections 70 and within two of the sections 72. The sections 70 and 72 are sized to allow a person such as maintenance worker 66 to service the maintenance components 18 and/or 112 while standing within one of the sections 70 or 72. The partitions 90 include openings 92 sized to allow a person to move between the sections 70 or 72.

The sections 70 are connected to a sub deck section 80 by a door 78, and to a sub deck section 82 by a door 86. The door 78 is sized and configured to allow a person to move through the door 78 and between sections 70 and 80. In exemplary embodiments, the sub deck section 80 includes a lubrication system 24. The section 80 is sized to allow a person to service the lubrication system 24 while standing within the section 80. The sections 70 are also connected to a sub deck section 82 by another door 86. The door 86 is sized to allow a person to move through the door 86 and between sections 70 and 82. The sub deck section 82 may include a portion of a fire suppression system 20. The section 82 is sized to allow a person to service the fire suppression system 20 while standing within the section 82.

The sections 72 are connected to a sub deck section 84 by a door 88. The door 88 is sized and configured to allow a person to move through the door 88 and between sections 72 and 84. In exemplary embodiments, the sub deck section 84 includes a portion of the fire suppression system 20. The section 84 is sized to allow a person to service the fire suppression system 20 while standing within the section 84. The sub deck 14 also includes a section 108 that is substantially empty. In exemplary embodiments, the sub deck 14 may include one or more sections, such as section 108, that are substantially empty and configured to receive one or more additional maintenance components.

The sub deck 14 also includes a ballast box having three segments 26, 28, and 30. The right hand segment 30 is connected to the sub deck section 84 by a door 74. The segments 26, 28, and 30 include a plurality of intersecting dividers 94 having one or more openings 76 sized and configured to allow a person to move between the segments 26, 28, and 30 of the ballast box. The right hand segment 30 is connected to the center segment 28, and the center segment 28 is connected to the left hand segment 26. The center segment 28 also includes openings 76 connecting the ballast box to a revolving frame 32. The revolving frame 32 also includes one or more openings 96 sized and configured to allow a person to move freely within the revolving frame 32. The revolving frame 32 has a predetermined depth. The predetermined depth is such that the main deck 16 and the sub deck 14 are sized to allow a person to move freely within the decks 14 and 16.

The construction and arrangement of the multi-deck mining vehicle, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

INDUSTRIAL APPLICABILITY

The configuration for the disclosed multi-deck mining vehicle may be implemented into any industrial vehicle having more than one component requiring periodic maintenance in order to improve the maintainability of such components. The disclosed configuration for the maintenance components may eliminate the use of a lift and/or harnesses to service maintenance components on industrial vehicles by moving the maintenance components from underneath the vehicle to an inner housing. This may reduce the time required to service the vehicles and therefore reduce machine downtime. The disclosed configuration may also increase the clearances between maintenance components, again reducing the time required to service the vehicles and reducing machine downtime. In addition, the disclosed configuration may create space for adding additional components to the vehicle without increasing the vehicle's footprint.

It will be apparent to those skilled in the art that various modifications and variations can be made to the disclosed mining vehicle. Other embodiments will be apparent to those skilled in the art from consideration of the specification and practice of the disclosed mining vehicle. It is intended that the specification and examples be considered as exemplary only, with a true scope being indicated by the following claims and their equivalents.

What is claimed is:

1. A mining vehicle, comprising:
   one or more crawlers configured to move the mining vehicle along a surface;
   a first deck positioned above the crawlers and having a first inner housing and a first outer housing, the first deck comprising:
     a first floor surface configured to provide a walking surface for a person to walk within the first inner housing;
     one or more first deck maintenance components positioned within the first inner housing and configured to allow a person to move among and access the first deck maintenance components;
   a second deck positioned above the first deck and having a second inner housing and a second outer housing, the second deck comprising:
     a second floor surface configured to provide a walking surface for a person to walk within the second inner housing;
     one or more second deck maintenance components positioned within the second inner housing;
     one or more aisles formed by the second floor surface and the second deck maintenance components, the aisles configured to allow a person to move among and access the second deck maintenance components;
   a first walkway coupled to the first outer housing of the first deck;

a second walkway coupled to the second outer housing of the second deck;
a first staircase coupling the first walkway to the second walkway; and
a second staircase coupling the second walkway to a top portion of the mining vehicle; and
wherein the first and second decks are configured to provide maintenance access to the first and second deck maintenance components; wherein the first walkway provides access to the first inner housing, and the second walkway provides access to the second inner housing; and wherein the first and second staircases are configured to allow a person to move between the first walkway and the second walkway, and between the second walkway and the top portion.

2. The mining vehicle of claim 1, wherein the first deck comprises one or more sections formed by one or more partitions, the sections being configured to house one or more first deck maintenance components.

3. The mining vehicle of claim 2, wherein the one or more partitions comprise one or more openings sized and configured to allow a person to move through the openings and between sections.

4. The mining vehicle of claim 2, wherein one or more sections are substantially empty and configured to receive one or more maintenance components.

5. The mining vehicle of claim 1, wherein the first deck maintenance components comprise one or more swing motors, one or more oil coolers, a fire suppression system, and a lubrication system.

6. The mining vehicle of claim 1, wherein the second deck maintenance components comprise an auxiliary air system, a power skid, a PLC, one or more swing motors, and one or more motor control centers.

7. The mining vehicle of claim 1, further comprising hoist machinery coupled to the second outer housing, the hoist machinery configured to provide maintenance access to the hoist machinery.

8. A machine housing for a mining vehicle, comprising:
an upper level disposed within an interior of the machine housing;
a lower level disposed below the upper level within the interior of the machine housing;
hoist machinery housed in the upper level;
swing drives and swing gear cases housed in the lower level;
an upper floor surface disposed in the upper level, the upper floor surface being sized and configured to allow maintenance personnel to reach the hoist machinery;
a lower floor surface disposed in the lower level, the lower floor surface being sized and configured to allow maintenance personnel to reach the swing drives and swing gear cases:
a lower walkway coupled to an exterior of the machine housing;
an upper walkway coupled to the exterior of the machine housing and positioned above the lower walkway;
a lower staircase coupling the lower walkway to the upper walkway; and
an upper staircase coupling the upper walkway to a top portion of the mining vehicle; and
wherein the lower walkway provides access to the lower level, and the upper walkway provides access to the upper level and wherein the upper and lower staircases are configured to allow a person to move between the lower walkway and the upper walkway, and between the upper walkway and the top portion.

9. The machine housing of claim 8, wherein the upper level houses one or more upper level maintenance components, and the lower level houses one or more lower level maintenance components, the upper and lower floor surfaces being sized and configured to allow maintenance personnel to access the upper and lower level maintenance components from the floor surfaces.

10. The machine housing of claim 9, wherein the lower level comprises one or more sections formed by one or more partitions, the sections being configured to house one or more lower level maintenance components.

11. The machine housing of claim 10, wherein the one or more partitions comprise one or more openings sized and configured to allow a person to move through the openings and between sections.

12. The machine housing of claim 10, wherein one or more sections are substantially empty and configured to receive one or more maintenance components.

13. The machine housing of claim 9, the upper level further comprising one or more aisles formed by the upper floor surface and the upper level maintenance components, the aisles sized and configured so that substantially all of the upper level maintenance components are accessible for servicing from the aisles.

* * * * *